R. C. FAY.
Screw-Cutting Die.

No. 220,592. Patented Oct. 14, 1879.

WITNESSES:
Joseph A. Miller Jr
William L. Coop.

INVENTOR:
Rimmon C. Fay
by Joseph A. Miller
Attorney

UNITED STATES PATENT OFFICE.

RIMMON C. FAY, OF PAWTUCKET, ASSIGNOR OF ONE-HALF OF HIS RIGHT TO FRANCIS J. RABBETH, OF PROVIDENCE, RHODE ISLAND.

IMPROVEMENT IN SCREW-CUTTING DIES.

Specification forming part of Letters Patent No. 220,592, dated October 14, 1879; application filed February 13, 1879.

*To all whom it may concern:*

Be it known that I, RIMMON C. FAY, of Pawtucket, in the county of Providence, State of Rhode Island, have invented a new and useful Improvement in Screw - Cutting Dies; and I hereby declare that the following is a full, clear, and exact description of the same, reference being had to the accompanying drawings, forming part of this specification.

Figure 1:
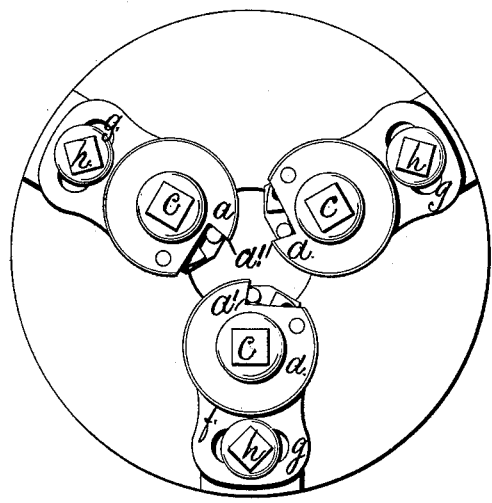
Figure 2:
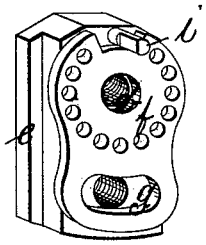
Figure 3:
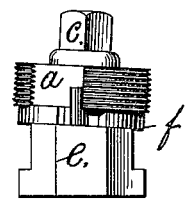
Figure 4:
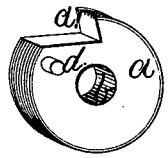

Figure 1 is a view of a chuck such as are used in screw - cutting machines. It is provided with three disk-cutters, secured to adjustable jaws sliding in radial grooves. Fig. 2 is a perspective view of the adjusting-plate, provided with a series of holes, into which a pin on the cutter-disk enters, so that the disk and plate can be adjusted together and held by a screw passing through a curved slot and holding the plate to the sliding jaw. Fig. 3 is an end view, showing the jaw - adjusting plate and cutter-disk; and Fig. 4, a perspective view of the cutter-disk, provided with the pin which enters the adjusting-plate.

This invention has reference to an improved method for securing and adjusting the kind of cutters known as "disk-cutters," in which the shape or form of the cutter forms the edge of a disk, from which an angular section is removed, so that by grinding the face of the cutter a new cutting-edge is produced, until the whole, or nearly the whole, disk has been used.

The object of this invention is to firmly hold the disk, so as to withstand the strain on its cutting-edge, and to adjust the cutting-edge after each grinding to the exact point desired; and the invention consists in providing an adjusting plate or holder, to which the disk-cutter is firmly secured, and by which the same can be accurately adjusted, as will be more fully set forth hereinafter, and pointed out in the claims.

In the drawings, $a\ a\ a$ are the disk-cutters proper, which consist of a circular disk of steel, provided with the central hole, $b$. The disks are turned so that the hole $b$ is in the exact center of the disk $a$, and all parts of the periphery equal distance from the central hole.

The edge of the disk, when used for screw-cutting, is provided with a number of V-shaped grooves turned in the edge and corresponding with the section of the thread to be cut; but either a plain straight surface or any desired curvature or molding may be turned on the edge of the disks, and they may be used in various ways for turning and shaping when a portion of the disk is cut out, as shown, so as to form a cutting-edge at $a'$. The disk is now hardened, and the edge ground ready for use as a cutter or tool. It is secured by a screw, $c$, closely filling the central hole, $b$, and entering a nut in the jaw or other fixed portion of the machine in which it is used, the head of the screw $c$ holding the disk $a$ firmly against the jaw or rest; and when used for cutting screws the disk is secured to a jaw at such an angle as corresponds to the pitch of the screw, all of which is fully set forth in the patent granted to me January 9, 1877, for improvements in screw-cutting dies, and numbered 186,037, and on which the present invention is an improvement.

When such cutter-disks are secured by the central screw they are liable to yield to any extra strain or excessive feed. To firmly secure the disk against all possible strain and relieve the central screw from excessive strain, I provide the disk with one or more pins, $d$, and drill holes in the seat on which the disk rests to receive the pin or pins, so that when in place the strain on the cutting-edge is resisted by the pin or pins, and the disk is prevented from turning or shattering. In place of the pin $d$, ratchet-teeth or other projections may be used to resist the turning of the disk when held by the central screw.

As, however, the cutting - edge $a'$ becomes worn it must be ground, and the amount of grinding varies with the nature of the injury to this edge—it may at one time require much more grinding to secure a proper cutting-edge than at other times; and as the pin $d$, or its equivalent, must enter one of the holes or recesses, the position of the cutting-edge could not be as nicely adjusted as it could have been without the pins, ratchets, or other devices for holding the same. To overcome this defect I place between the cutter-disk and the tool-holder or jaw $e$ the adjustable disk-holder $f$, pivoted on the screw-stud $c$, by which the disk is secured, and provided with holes to receive the pin *d* or its equivalent, so that when the disk is secured to the disk-holder, and before the screw *c* is turned down tight, the cutting-edge may be accurately adjusted by turning the disk-holder *f* and the disk on the screw, and to firmly hold both I extend the disk-holder plate *f*, as shown in Fig. 2, beyond the disk, and provide the same with a curved slot, *g*, and the clamp-screw *h*, and thus firmly secure the whole in the adjusted position, and then turn down the screw *c* firmly on the disk *a*, and the cutter will resist any strain the cutting-edge may encounter.

The cutter may now be ground with the sole object in view of securing a good cutting-edge, and when made secure to the holder-plate *f* it can be accurately adjusted, or in a screw-cutting die set to the guide-post *i*, without any extraordinary care or trouble, and it will be more firmly held than cutter-disks as heretofore constructed.

Having thus described my invention, I claim as new and desire to secure by Letters Patent—

1. The combination, with a circular cutter-disk arranged to be ground successively around the periphery of the disk, substantially as described, and provided with a pin or projection, of an adjustable holder, arranged to hold the disk by means substantially as and for the purpose set forth.

2. The combination, with the jaw or tool-holder *e*, of the adjustable plate *f*, provided with a central hole, a series of holes arranged to receive the pin *d*, and the curved slot *g*, the disk *a*, screw *c*, and clamp-screw *h*, the whole arranged to hold and adjust the circular cutter-disk, as and for the purpose set forth.

RIMMON C. FAY.

Witnesses:
 JOSEPH A. MILLER,
 JOSEPH A. MILLER, Jr.